(12) United States Patent
Zhu (10) Patent No.: US 8,983,544 B2
(45) Date of Patent: Mar. 17, 2015

(54) COMMUNICATION SYSTEM AND COMMUNICATION METHOD

(75) Inventor: Shan Zhu, Shenzhen (CN)

(73) Assignee: Nationz Technologies Inc., Shenzhen (CN)

(*) Notice: Subject to any disclaimer, the term of this patent is extended or adjusted under 35 U.S.C. 154(b) by 164 days.

(21) Appl. No.: 13/884,987

(22) PCT Filed: Nov. 14, 2011

(86) PCT No.: PCT/CN2011/082143
§ 371 (c)(1),
(2), (4) Date: May 13, 2013

(87) PCT Pub. No.: WO2012/075876
PCT Pub. Date: Jun. 14, 2012

(65) Prior Publication Data
US 2013/0231056 A1 Sep. 5, 2013

(30) Foreign Application Priority Data

Dec. 6, 2010 (CN) .......................... 2010 1 0574647
Dec. 24, 2010 (CN) ..................... 2010 2 0678901 U
Dec. 31, 2010 (CN) .......................... 2010 1 0618673

(51) Int. Cl.
*H04B 7/24* (2006.01)
*G06K 19/077* (2006.01)

(52) U.S. Cl.
CPC ............ *H04B 7/24* (2013.01); *G06K 19/07769* (2013.01)

USPC .......................................... 455/558; 455/41.2

(58) Field of Classification Search
CPC .......... H04L 63/0853; H04M 1/72519; H04M 2250/14; H04B 1/3816
USPC ........................ 455/41.1, 41.2, 558, 39, 575.1
See application file for complete search history.

(56) References Cited

U.S. PATENT DOCUMENTS

| | | | |
|---|---|---|---|
| 8,090,407 B2 * | 1/2012 | Bashan et al. ................. | 455/558 |
| 2003/0213849 A1 * | 11/2003 | Luu ............................... | 235/492 |
| 2005/0212690 A1 * | 9/2005 | Nishikawa ................... | 340/932.2 |
| 2010/0090805 A1 * | 4/2010 | Libotte ........................ | 340/10.2 |

* cited by examiner

*Primary Examiner* — Sonny Trinh
(74) *Attorney, Agent, or Firm* — Anova Law Group, PLLC (57) ABSTRACT

The present invention relates to a communication system and a communication method. The communication system includes a micro IC card, a radio frequency (RF) card sleeve and a multi-frequency card reader. The micro IC card is used to communicate with the RF card sleeve through a contact interface. The multi-frequency card reader is used to perform an RF communication with the RF card sleeve. The communication method includes exchanging data with a micro IC card through an RF channel; and the micro IC card sleeve exchanges data with the micro IC card by a contact communication. The communication system and method provide operators a working environment to adapt cards with different frequencies. Thus, telecommunication operators and financial service providers are able to independently issue their own cards, which lowers difficulties of promoting mobile payment services, and aids to boost the popularization and applications of the mobile payment services.

21 Claims, 4 Drawing Sheets

COMMUNICATION SYSTEM AND COMMUNICATION METHOD

FIELD OF THE INVENTION

The present invention relates to the field of communication and, more particularly, relates to a communication system and communication method.

BACKGROUND OF THE INVENTION

With the growing popularity of mobile terminals, mobile payment using mobile terminals has become in high and urgent demands. Although there are many implementation solutions, these solutions all have their disadvantages. Currently, methods adding radio frequency (RF) functions onto the subscriber identity module (SIM) of a mobile terminal (called an RF SIM card) or adding a short-distance communication module on the main board of a mobile terminal to achieve a short-distance communication of the mobile terminal have been developed. The later short-distance communication is called near field communication (NFC). These methods have enabled the mobile terminal to become a super smart terminal which can be used to recharge, shop, transact, or verify identification. This significantly fulfills the imperious market demands.

The short-distance solution based on the mobile-terminals with RF SIM cards has attracted extensive attentions because of its simplicity and no need to modify the mobile terminals. In such solution, the RF SIM card uses an ultra-high frequency (UHF) technology. Because the UHF SIM card, especially the SIM card using a 2.4 GHz•ISM public frequency range (i.e., the industry, science, and medical frequency), has a very high working frequency, and the size of antenna is small, RF signals with sufficient strength can be generated by putting a small antenna in a SIM card. Thus, even when the SIM card is installed inside a mobile terminal, the RF signals can still emit from the mobile terminal. An industry-widely-used RF transceiver chip installed in a card reader can reliably receive RF signals from a majority of the mobile terminals without extra amplification. Thus, this can enable the mobile terminals to achieve the short-distance communication function without modifying the existing mobile terminals.

An RF SIM card integrates a master CPU, a memory cell, an RF chip, an RF antenna, and peripheral circuitry into a single card. The RF SIM card simultaneously has the functions of a normal SIM card and the financial functions, such as a non-contact wallet, a debit card, and a credit card, etc. The user only needs to change one card in order to use the mobile terminal to achieve various functions of normal communication and credit card payments with a cell phone, etc.

However, often RF SIM cards can only be issued by telecommunication operators, and the telecommunication operators often cannot directly provide financial services. Moreover, considering the security issues, financial service providers or banks cannot hand over the right of making financial cards to the telecommunication operators. Thus, when the telecommunication operators and the financial service providers cannot cooperate with each other, it may be a difficult to promote mobile payment business, slowing down the progress.

SUMMARY OF THE INVENTION

The technical problems to be solved by the present invention include providing a communication system and communication method to reduce the difficulties for promoting mobile payment services. In order to solve above-mentioned technical problems, the present invention provides a micro IC card.

The micro IC card includes: a first communication interface for performing a contact communication; a second communication interface for performing a contactless communication; and a main module for processing data transceived by the first communication interface and the second communication interface, and controlling the first communication interface and the second communication interface.

Further, the micro IC card includes: a first conductive component electrically connected with the first communication interface; and a second conductive component electrically connected with the second communication interface.

Further, the first conductive component and the second conductive component are both metal contact points.

Further, the micro IC card is a micro SIM card, a micro UIM card, or a micro USIM card.

Further, the first communication interface is a 7816 interface; and the second communication interface is a radio frequency (RF) communication interface.

In order to solve above-mentioned technical problems, the present invention provides a radio frequency (RF) card sleeve.

The RF card sleeve includes: a first card body; a first holding chamber configured on the first card body to hold a micro IC card; a main interface, a main control module, and an RF module installed in the first card body, wherein: the main interface, the main control module, and the RF module are sequentially connected; the main interface is used to communicate with the micro IC card installed in the first holding chamber; the RF module is used for an RF communication; and the main control module is used to perform transceiving and initial analysis of task commands, and to distribute the task commands based on the initial analysis results.

Further, the micro IC card includes: a first communication interface for performing a contact communication; a second communication interface for performing a contactless communication; and a main module for processing data transceived by the first communication interface and the second interface, and controlling the first communication interface and the second communication interface.

Further, in the RF card sleeve, a size and an appearance of the first card body are the same as those of a standard IC card to which the micro IC card corresponds.

Further, a sub-interface and a value-added process module are installed in the first card body, wherein: the sub-interface is used to connect the main control module and peripheral equipment; and the value-added process module is used to process the value-added service commands.

Further, a third conductive component electrically connected with the main interface is installed in the first holding chamber.

Further, the RF communication module includes a low frequency inductive circuit, a low frequency amplifying circuit, a decision gate/demodulation circuit, a first control/interface circuit, an RF transceiver circuit, and a first RF antenna; and
the low frequency inductive circuit, the low frequency amplifying circuit, the decision gate/demodulation circuit, the first control/interface circuit, the RF transceiver circuit, and the first RF antenna are sequentially connected in serial.

Further, the first holding chamber is a groove or a slot.

In order to solve above-mentioned technical problems, the present invention provides a dual-interface card sleeve.

The dual-interface card sleeve includes: a second card body; a second holding chamber installed in the second card body for holding a micro IC card; and an antenna installed in or on the second card body, wherein:
the antenna is used to connect with the micro IC card installed in the second holding chamber to corporate with the micro IC card to perform a contactless communication.

Further, the micro IC card includes: a first communication interface for performing a contact communication; a second communication interface for performing a contactless communication; and a main module for processing data transceived by the first communication interface and the second interface, and controlling the first communication interface and the second communication interface.

Further, a fourth conductive component electrically connected with the antenna is installed in the second holding chamber.

Further, the second holding chamber is a groove or a slot.

In order to solve above-mentioned technical problems, the present invention provides a multi-frequency card reader.

The multi-frequency card reader includes: a peripheral interface; a main controller; a first read module; and a second read module, wherein:
the first read module is used to communicate with an IC card installed in the RF card sleeve through a first RF channel; the second read module is used to communicate with an IC card installed in the dual-interface card sleeve through a second RF channel; the peripheral interface is used to communicate with peripheral equipment; and the main controller is used to control the peripheral interface, the first read module and the second read module.

Further, the micro IC card includes: a first communication interface for performing a contact communication; a second communication interface for performing a contactless communication; and a main module for processing data transceived by the first communication interface and the second interface, and controlling the first communication interface and the second communication interface;
the RF card sleeve includes: a first card body; a first holding chamber installed in the first card body for holding the micro IC card; and a main interface, a main control module, and RF communication module installed in the first card body, wherein:
the main interface is used to communicate with the micro IC card installed in the first holding chamber; the RF module is used to perform RF communication; and the main control module is used to perform transceiving and initial analysis of task commands, and to distribute the task commands based on the initial analysis results; and
the multi-frequency card reader includes: a first read module for communicating with the micro IC card installed in the RF card sleeve through a first RF channel; a second read module for communicating with the micro IC card installed in a dual-interface card sleeve through a second RF channel; a peripheral interface for communicating with peripheral equipment; and a main controller for controlling the peripheral interface, the first read module, and the second read module.

Further, the first read module includes a low frequency transmitting coil, a drive circuit, a code circuit, a second control and interface circuit, a second RF transceiver circuit and a second RF antenna; and the low frequency transmitting coil, the drive circuit, the code circuit, the second control/interface circuit, the second RF transceiver circuit and the second RF antenna are sequentially connected in serial.

Further, a working frequency of the first read module is 2.4 GHz; and a working frequency of the second read module is 13.56 MHz.

In order to solve above-mentioned technical problems, the present invention provides a communication system.

The communication system includes: a micro IC card; a radio frequency (RF) card sleeve; and a multi-frequency card reader, wherein: the micro IC card is used to communicate with the RF card sleeve through a contact interface; and the multi-frequency card reader is used to perform RF communication with the RF card sleeve.

Further, the micro IC card includes: a first communication interface for performing a contact communication; a second communication interface for performing a contactless communication; and a main module for processing data transceived by the first communication interface and the second interface, and controlling the first communication interface and the second communication interface;
the RF card sleeve includes: a first card body; a first holding chamber installed in the first card body for holding the micro IC card; a main interface, a main control module, and an RF communication module installed in the first card body, wherein:
the main interface, the main control module, and the RF communication module are sequentially connected; the main interface is used to communicate with the micro IC card installed in the first holding chamber; the RF module is used to perform an RF communication; and the main control module is used to perform transceiving and initial analysis of task commands, and to distribute the task commands based on the initial analysis results; and
the multi-frequency card reader includes: a first read module for communicating with the micro IC card installed in the RF card sleeve through a first RF channel; a second read module for communicating with the micro IC card installed in a dual-interface card sleeve through a second RF channel; a peripheral interface for communicating with peripheral equipment; and a main controller for controlling the peripheral interface, the first read module, and the second read module.

Further, the communication system further includes a dual-interface sleeve used to cooperate with the micro IC card to perform a contactless communication.

Further, the dual-interface card sleeve includes a second card body; a second holding chamber is installed in the second card body for holding a micro IC card; an antenna is installed in or on the second card body; and the antenna is used to connect with the micro IC card installed the second holding chamber to cooperate with the micro IC card to perform a contactless communication.

In order to solve above-mentioned technical problems, the present invention provides a communication system.

The communication system includes: a micro IC card; a dual-interface card sleeve; and a multi-frequency card reader, wherein:
the dual-interface card sleeve is used to cooperate with the micro IC card to perform a contactless communication; and the multi-frequency card reader is used to perform an RF communication with the micro IC card installed in the double interface.

Further, the communication system includes: the micro IC card includes: a first communication interface for performing a contact communication; a second communication interface for performing a contactless communication; and a main module for processing data transceived by the first communication interface and the second interface, and controlling the first communication interface and the second communication interface;

the dual-interface card sleeve includes: a second card body; a second holding chamber installed in the he second card body for holding a micro IC card; and an antenna installed in or on the second card body used for connecting with the micro IC card installed the second holding chamber to cooperate with the micro IC card to perform a contactless communication; and the multi-frequency card reader includes: a first read module for communicating with the micro IC card installed in the RF card sleeve through a first RF channel; a second read module for communicating with the micro IC card installed in a dual-interface card sleeve through a second RF channel; a peripheral interface for communicating with peripheral equipment; and a main controller for controlling the peripheral interface, the first read module, and the second read module.

In order to solve above-mentioned technical problems, the present invention provides a communication system.

The communication method includes exchanging data with a micro IC card through an RF channel, where the micro IC card sleeve exchanges data with a micro IC card by a contact communication.

In order to solve above-mentioned technical problems, the present invention provides a communication method. The communication method includes exchanging data with a micro IC card installed in a micro IC card sleeve through an RF channel.

The communication system and communication method of the present invention provide service providers a working environment to adapt cards with different frequencies. Thus, telecommunication operators and financial service providers are able to independently issue their own cards, which lowers difficulties of promoting mobile payment services, and aids to boost the popularization and applications of the mobile payment services.

DETAILED DESCRIPTION OF THE INVENTION

The followings describe the principles and features of the present invention along with drawings, the disclosed embodiments are only for the purpose of explaining the present invention, and are not intended to limit the protection scope of the present invention.

Figure 1:
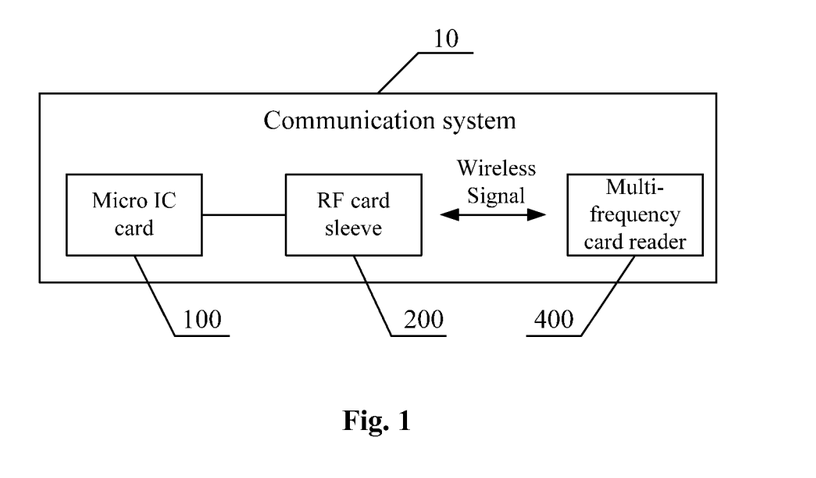
FIG. 1 illustrates a schematic diagram of a communication system consistent with disclosed embodiments of the present invention.

FIG. 1 illustrates a schematic diagram of a communication system consistent with disclosed embodiments of the present invention. As shown in FIG. 1, in one embodiment, a communication system 10 includes a micro IC card 100, an RF card sleeve 200 and a multi-frequency card reader 400. The micro IC card 100 and the RF card sleeve 200 are connected with a wired medium. The multi-frequency card reader 400 and the RF card sleeve 200 are connected with a wireless medium. The micro IC card 100 communicates with the RF card sleeve 200 through a contact interface, and the multi-frequency card reader 400 communicates with the RF card sleeve 200 through RF communication, i.e., contactless communication.

Figure 2:
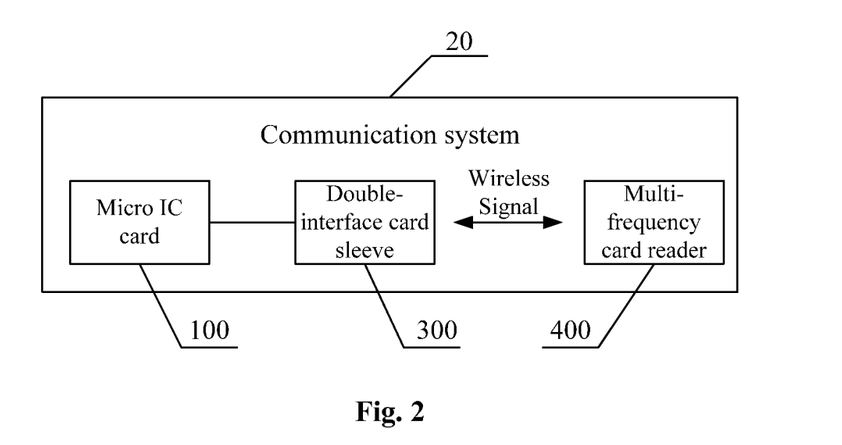
FIG. 2 illustrates another schematic diagram of a communication system consistent with disclosed embodiments of the present invention.

FIG. 2 illustrates another schematic diagram of a communication system consistent with disclosed embodiments of the present invention. As shown in FIG. 2, in one embodiment, a communication system 20 includes micro IC card 100, a dual-interface card sleeve 300, and multi-frequency card reader 400. The micro IC card 100 and the dual-interface card sleeve 300 are connected with a wired medium. The multi-frequency card reader 400 and the dual-interface card sleeve 300 are connected with a wireless medium. The dual-interface card sleeve 300 is used to cooperate with the micro IC card 100 to perform contactless communication. The multi-frequency card reader 400 is used to perform RF communication with the micro IC card 100 installed in the dual-interface card sleeve 300.

In certain other embodiments of the present invention, the communication system may include micro IC card 100, RF card sleeve 200, dual-interface card sleeve 300, and multi-frequency card reader 400. Here, the micro IC card 100 may choose any one of the RF card sleeve 200 and the dual-interface card sleeve 300 to connect with in order to communicate with the multi-frequency card reader 400.

Followings describe certain detailed structures of the micro IC card 100, the RF card sleeve 200, the dual-interface card sleeve 300, and the multi-frequency card reader 400 of the communication system 10 and the communication system 20, respectively.

Figure 3:
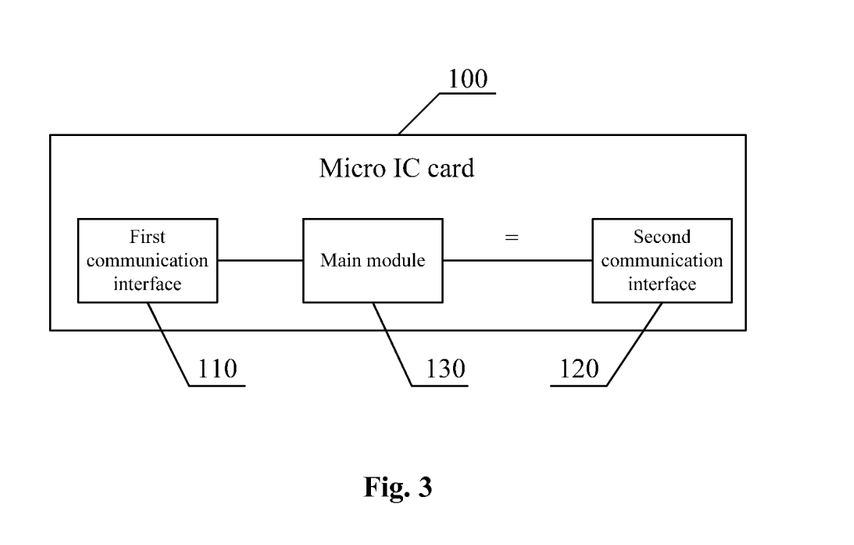
FIG. 3 illustrates a schematic diagram of a micro IC card consistent with disclosed embodiments of the present invention.

FIG. 3 illustrates a schematic diagram of a micro IC card consistent with disclosed embodiments of the present invention. As shown in FIG. 3, in one embodiment, the micro IC card 100 includes a first communication interface 110, a second communication interface 120 and a main module 130. The first communication interface 110 and the second communication interface 120 are connected with the main module 130, respectively. The first communication interface 110 is used to perform contact communication. The second communication interface 120 is used to perform contactless communication. The main module 130 is an ontology module of the micro IC card 100, and is used to process data transceived (i.e., transmitted and received) by the first communication interface 110 and the second communication interface 120, and to control the first communication interface 110 and the second communication interface 120.

The first communication interface 110 may be a 7861 interface, and the second communication interface 120 may be an RF communication interface. In a specific application, a typical working frequency of the second interface 120 may be 13.56 MHz.

In certain other embodiments of the present invention, the micro IC card 100 may also include a first conductive component electrically connected with the first communication interface 110 and a second conductive component electrically connected with the second communication system 120. For example, the first conductive component and the second conductive component may be conductive metal contact points.

Further, the micro IC card 100 may be a micro SIM card, a micro UIM card, or a micro USIM card, etc. The micro IC card 100 according to the present invention has two communication interfaces: a contact interfaces and a contactless interface. It can perform both contact communication and contactless communication, extending the application scope of the micro IC card 100.

Figure 4:
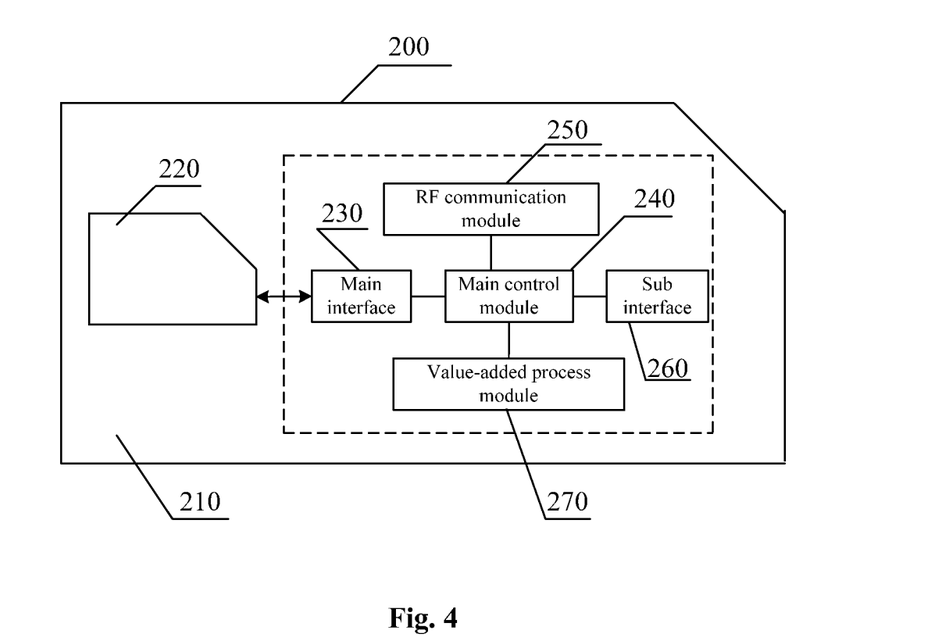
FIG. 4 illustrates a schematic diagram of an RF card sleeve consistent with disclosed embodiments of the present invention.

FIG. 4 illustrates a schematic diagram of an RF card sleeve consistent with disclosed embodiments of the present invention. As shown in FIG. 4, in one embodiment, the RF card sleeve includes a first card body 210. A first holding chamber 220 is configured on the first card body 210 to hold the micro IC card 100. The first card body 210 includes, sequentially connected, a main interface 230, a main control module 240, and an RF communication module 250. The main interface 230 is used to communicate with the micro IC card 100 installed in the first holder chamber 220.

The size and appearance of the first card body 210 may be the same as those of a standard IC card corresponding to the micro IC card 100. Thus, it is convenient to install the RF card sleeve into an IC card holding structure of existing equipment. Wherein, the standard micro IC card to which the micro IC card 100 corresponds may be a SIM card, a UIM card, or a USIM card, etc. For example, the size and appearance of the first card body 210 may be designed to be same as those of a SIM card, thus the RF card sleeve 200 may be directly installed into a holding structure of a SIM card in a mobile phone. A total number of the first holding chamber 210 may be one or more.

Therefore, when the micro IC card 100 is installed into the first holding chamber 220 of the RF card sleeve 200, the micro IC card 100 can perform an RF communication using the RF module 250 of the RF card sleeve 200. That is, the micro IC card 100 may connect with the main interface 230 (contact interface) of the RF card sleeve 200 by its own first communication interface 110, and transfer data needed to be transceived by the first communication interface 110 to the main control module 240. Then the data is transceived by the RF communication module 250 controlled by the main control module 240. The first holding chamber 220 may be a groove or a slot.

Referring to FIG. 4 again, a sub-interface 260 and a value-added service process module 270 may be installed in the first card body 210 of the RF card sleeve 200. The sub-interface 260 and the value-added service process module 270 are connected with the main control module 240, respectively. Among them, the sub-interface 260 is used to connect the main control module 240 and the peripheral equipment, such as a mobile terminal, a contact card reader, etc., and to serve as a bridge of two-way data communications. The sub-interface 260 may be designed as to match requirements of the related industry standard.

The main control module 240 is used to achieve transceiving and initial analysis of task commands, and to distribute the task commands base on the initial analysis (transfer certain task commands to the value-added service process module 270 and certain task commands to the micro IC card 100 by the main interface 230, respectively), and to return task command processing results. The main interface 230 is used to connect the main control module 240 and the micro IC card 100 installed in the first holding chamber 220, and serves as a bridge of the two components for data communications.

The value-added service process module 270 is used to achieve the process of all value-added service commands. The RF communication module 250 is used to perform an RF communication. The RF communication module 250 may form an RF communication connection with an RF card reader, and may assist the value-added service process module 270 to achieve the processing of a value-added task. The RF signal of the RF communication module 250 may be in any frequency range. The RF communication module 250 may include a distance control unit, an RF transceiver unit, and an antenna, etc. The distance control unit may be achieved by a low frequency magnetic communication. The RF transceiving unit may be a high frequency communication transceiver, such as 2.4 GHz, etc. The value-added service process module 270 may be used to process various types of value-added services of telecommunication operators or financial service providers, such as mobile payment services.

A third conductive component may be installed in the first holding chamber 220, and the third conductive component is electrically connected with the main interface 230. The third conductive component is used to form an electrical connection with the first conductive component of the micro IC card 100 installed in the first holding chamber 220. The third conductive component may be a conductive contact point, such as a metal contact point. A fixing component may be installed in the first holding chamber 220 to fix the micro IC card 100, which ensures that the embedded micro IC card 100 has a stable contact and works normally.

Figure 5:
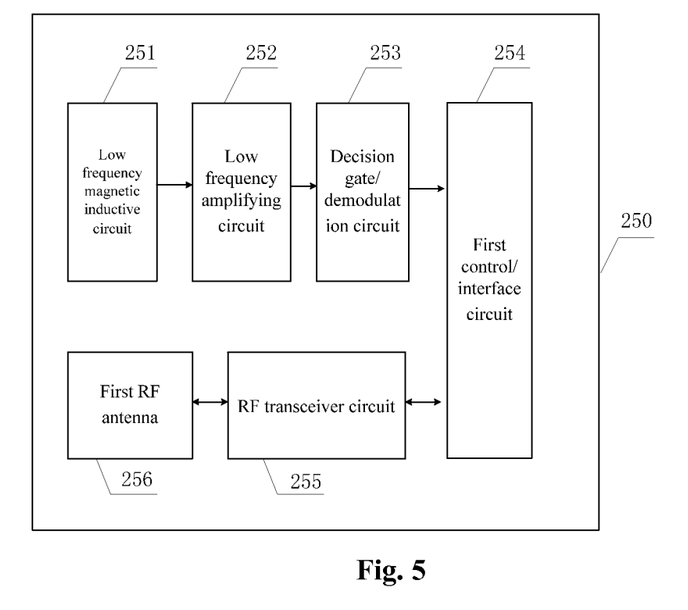
FIG. 5 illustrates a schematic diagram of an RF communication module 250 illustrated in FIG. 4.

FIG. 5 illustrates a schematic diagram of the RF communication module 250 illustrated in FIG. 4. As shown in FIG. 5, the RF communication module 250 may include a low frequency inductive circuit 251, a low frequency amplifying circuit 252, a decision gate/demodulation circuit 253, a first control/interface circuit 254, an RF transceiver circuit 255, and a first RF antenna 256. Among them, the low frequency inductive circuit 251, the low frequency amplifying circuit 252, the decision gate/demodulation circuit 253, the first control/interface circuit 254, the RF transceiver circuit 255, and first RF antenna 256 are sequentially connected in serial.

Figure 6:
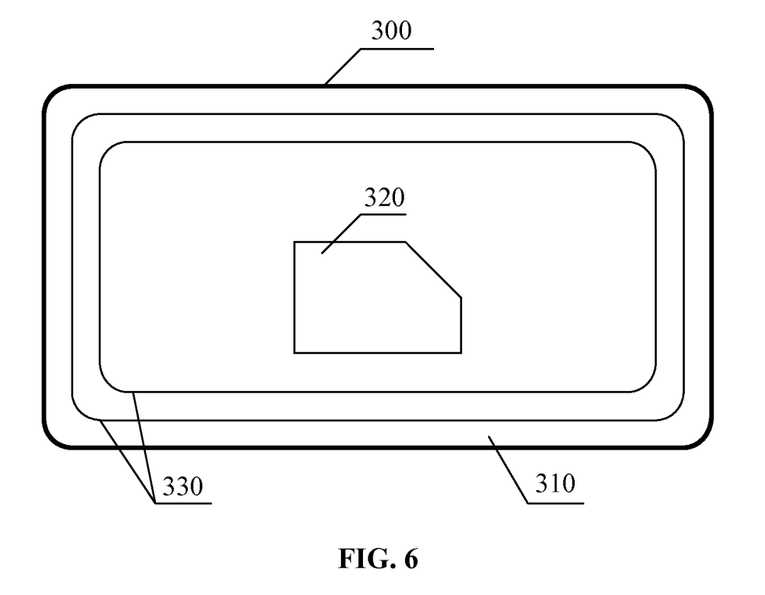
FIG. 6 illustrates a schematic diagram of a dual-interface card sleeve consistent with disclosed embodiments of the present invention.

FIG. 6 illustrates a schematic diagram of a dual-interface card sleeve consistent with disclosed embodiments of the present invention. As shown in FIG. 6, in one embodiment, the dual-interface card sleeve 300 includes a second card body 310. The second card body 310 has a second holding chamber 320 used for holding the micro IC card 100. An antenna 330 is installed on or in the second card body 310. The antenna 330 is used to connect with the second communication interface 120 of the micro IC card 100 installed in the second holding chamber 320, and cooperate with the micro IC card 100 to perform a contactless communication. The second holding chamber 320 may be a groove or a slot.

When the micro IC card 100 is installed in the second holding chamber 320 of the dual-interface card sleeve 300, a combination of the second communication interface 120 of the micro IC card 100 and the antenna 330 of the dual-interface card sleeve 300 may perform a contactless communication. A total number of the second holding chamber 320 installed on the second card body 310 may be one or more.

A fourth conductive component may be installed in the second holding chamber 320; and the fourth conductive component may electrically connect with the antenna 330. The fourth conductive component is used to electrically connect with the second conductive component of the micro IC card 100. Because the second conductive component of the micro IC card 100 and the second communication interface 120 are electrically connected, the antenna 330 of the dual-interface card sleeve 300 and the second communication interface 120 of the micro IC 100 may form a connection through the fourth conductive component and the second conductive component. The fourth conductive component may be a metal conductive contact point or an elastic conductive metal piece.

A fixing component may be installed in the second holding chamber 320 to fix the micro IC card 100, which ensures that the embedded micro IC card 100 has a stable contact and works normally.

Figure 7:
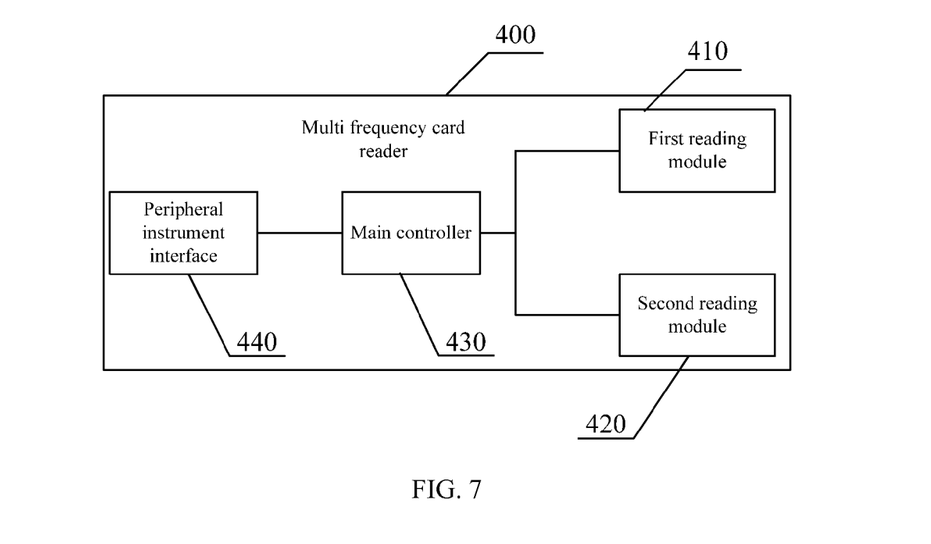
FIG. 7 illustrates a schematic diagram of a multi-frequency card reader consistent with disclosed embodiments of the present invention.

FIG. 7 illustrates a schematic diagram of a multi-frequency card reader consistent with disclosed embodiments of the present invention. As shown in FIG. 7, in one embodiment, the multi-frequency card reader 400 includes a first read module 410, a second read module 420, a main controller 430 and a peripheral interface 440. The peripheral interface 440, the first read module 410 and the second read module 420 connect with the main controller 430, respectively. The first read module 410 is used to communicate with the micro IC card 100 installed in the RF card sleeve 200 through a first RF channel. The second read module 420 is used to communicate with the micro IC card 100 installed in the dual-interface card sleeve 300 through a second RF channel. The peripheral interface is used to communicate with peripheral equipment (such as a POS host, an access host, or other hosts, used to process various business tasks). The main controller 430 is used to control the peripheral interface 440, the first read module 410 and the second read module 420. The multi-frequency card reader 400 may be an RF card reader.

In one embodiment of the multi-frequency card reader 400, a working frequency of the first read module 410 may be 2.4 GHz; and a working frequency of the second read module 420 may be 13.56 MHz.

Figure 8:
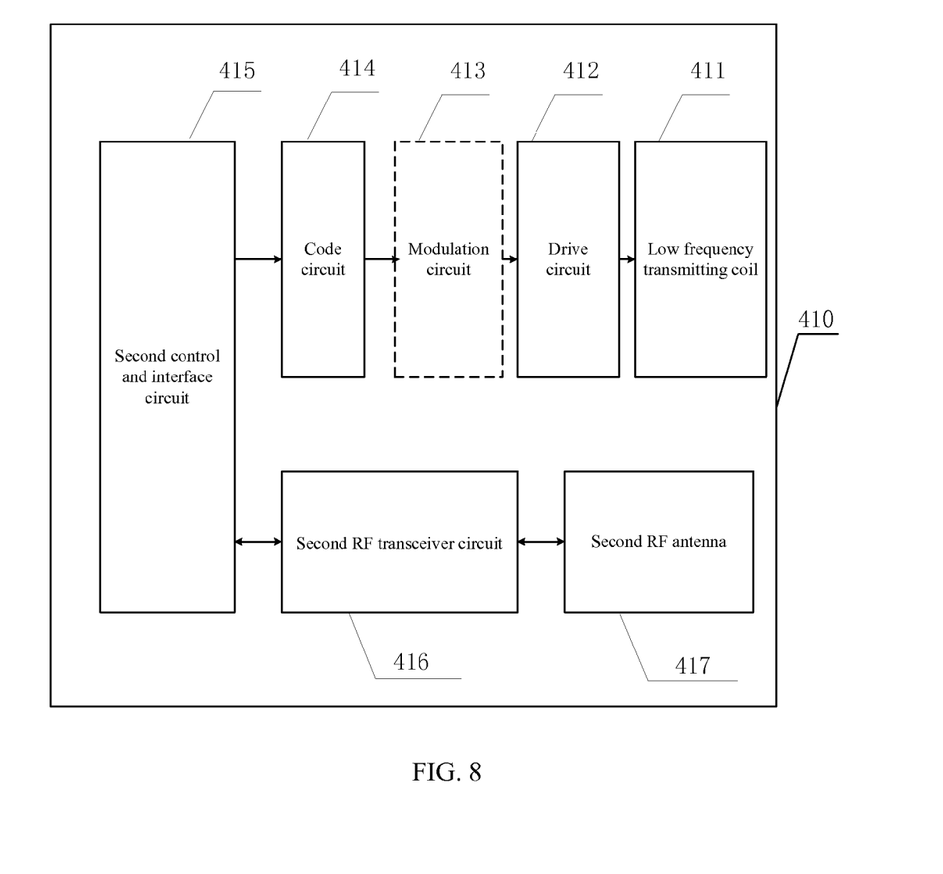
FIG. 8 illustrates a schematic diagram of a first read module 410 illustrated in FIG. 7.

FIG. 8 illustrates a schematic diagram of the first read module 410 illustrated in FIG. 7. As shown in FIG. 8, the first read module 410 may include a low frequency transmitting coil 411, a drive circuit 412, a code circuit 414, a second control/interface circuit 415, a second RF transceiver circuit 416, and a second RF antenna 417. Among them, the low frequency transmitting coil 411, the drive circuit 412, the code circuit 414, the second control/interface circuit 415, the second RF transceiver circuit 416 and the second RF antenna 417 are sequentially connected in serial. A modulation circuit 413 may be formed between the drive circuit 412 and the code circuit 413. The first read module 410 shown in FIG. 8 may communicate with the RF communication module 250 (shown in FIG. 5) to perform RF transactions.

POS hosts and other application hosts may perform communications and transactions with the RF card sleeve 200 or the dual-interface card sleeve 300 by installing a multi-frequency card reader 400. Telecommunication operators or financial service providers may install the POS hosts having the RF card reader 400 at different branches to accept or read cards with the above mentioned two-types different frequencies.

In practical applications, the micro card 100 may be issued by a telecommunication operator, and the RF card sleeve 200 may be issued by a financial service provider or a third party payment operator. When the micro IC card 100 is installed in the RF card sleeve 200, a telecommunication function and a financial service function may be achieved simultaneously.

In practical applications, the RF card sleeve 200 may also be issued by a telecommunication operator, and the micro card 100 may be issued by a financial service provider or a third party payment operator. When the micro IC card 100 is installed in the RF card sleeve 200, a telecommunication function and a financial service function may also be achieved simultaneously.

The communication system according to the present invention may be used in two different ways.

First, when a customer wants to directly use a mobile terminal for a card payment function or a recharge function, etc., the micro IC card 100 may be installed into the RF card sleeve 200, then the entire micro IC card 100 and the RF card sleeve are installed in a slot of a SIM card, an UIM card or a USIM card of the mobile terminal. Through an RF channel provided by the RF card sleeve 200, the micro IC card 100 can perform communication and transaction with the multi-frequency card reader 400 using the RF channel of a working frequency of 2.4 GHz.

Second, when the mobile terminal runs out of power or the user wants to remove the micro IC card 100 of the mobile terminal, the micro IC card 100 may be taken out from the RF card sleeve 200, and installed into the dual-interface card sleeve 300. Through the second communication module 120 of the micro IC card 100 and the antenna on the dual-interface card sleeve 300, the micro IC card 100 can perform communication and transaction with the multi-frequency card reader 400 using the RF channel of a working frequency of 13.56 MHz.

The communication system according to the present invention provides operators a processing environment to adapt cards with different frequencies. Thus, telecommunication operators and financial service providers are able to independently issue their own cards, which lowers difficulties of promoting mobile payment services, and aids to boost the popularization and applications of the mobile payment services. The present invention also provides a communication method, and the method is applicable to the communication system illustrated in FIG. 1. The communication method briefly includes exchanging data with a micro IC card installed in an IC card sleeve through an RF channel, and then the IC card sleeve exchanges data with the micro IC card by a contact communication.

The present invention also provides a communication method, and the method is applicable to the communication system illustrated in FIG. 2. The communication system briefly includes exchanging data with a micro IC card installed in a micro IC card sleeve by an RF channel.

The communication methods according to the present invention are applicable to the above mentioned communication systems, which provide operators a processing environment to adapt cards with different frequencies. Thus, telecommunication operators and financial service providers are able to independently issue their own cards, which lowers difficulties of promoting mobile payment services, and aids to boost the popularization and applications of the mobile payment services.

The above mentioned examples are only some disclosed embodiments, and are not used to limit the present invention. Within the spirit and the scope of the present invention, any modifications, equal substitutions and improvements of those embodiments are all within the scope of the present invention.

What is claimed is:
1. A radio frequency (RF) card sleeve, comprising:
a first card body;
a first holding chamber configured on the first card body to hold a micro IC card;
a main interface, a main control module, and an RF module installed in the first card body,
wherein:
    the main interface, the main control module, and the RF module are sequentially connected;
    the main interface is used to communicate with the micro IC card installed in the first holding chamber;
    the RF module is used for an RF communication; and the main control module is used to perform transceiving and initial analysis of task commands, and to distribute the task commands based on the initial analysis results.

2. The RF card sleeve according to claim 1, wherein the micro IC card further includes:
a first communication interface for performing a contact communication;
a second communication interface for performing a contactless communication; and
a main module for processing data tranceived by the first communication interface and the second interface, and controlling the first communication interface and the second communication interface.

3. The RF card sleeve according to claim 1, wherein:
a size and an appearance of the first card body are the same as those of a standard IC card to which the micro IC card corresponds.

4. The RF card sleeve according to claim 1, wherein:
a sub-interface and a value-added process module are installed in the first card body,
wherein:
the sub-interface is used to connect the main control module and peripheral equipment; and
the value-added process module is used to process the value-added service commands.

5. The RF card sleeve according to claim 1, wherein:
a third conductive component electrically connected with the main interface is installed in the first holding chamber.

6. The RF card sleeve according to claim 1, wherein:
the RF communication module includes a low frequency inductive circuit, a low frequency amplifying circuit, a decision gate/demodulation circuit, a first control/interface circuit, an RF transceiver circuit, and a first RF antenna; and
the low frequency inductive circuit, the low frequency amplifying circuit, the decision gate/demodulation circuit, the first control/interface circuit, the RF transceiver circuit, and the first RF antenna are sequentially connected in serial.

7. The RF card sleeve according to claim 1, wherein:
the first holding chamber is a groove or a slot.

8. A dual-interface card sleeve, comprising:
a second card body;
a second holding chamber installed in the second card body for holding a micro IC card; and
an antenna installed in or on the second card body,
wherein:
the antenna is used to connect with the micro IC card installed in the second holding chamber to corporate with the micro IC card to perform a contactless communication.

9. The dual-interface card sleeve according to claim 8, wherein:
the micro IC card includes:
a first communication interface for performing a contact communication;
a second communication interface for performing a contactless communication; and
a main module for processing data transceived by the first communication interface and the second interface, and controlling the first communication interface and the second communication interface.

10. The dual-interface card sleeve according to claim 8, wherein:
a fourth conductive component electrically connected with the antenna is installed in the second holding chamber.

11. The dual-interface card sleeve according to claim 8, wherein:
the second holding chamber is a groove or a slot.

12. A multi-frequency card reader, comprising:
a peripheral interface;
a main controller;
a first read module; and
a second read module,
wherein:
the first read module is used to communicate with an IC card installed in the RF card sleeve through a first RF channel; the second read module is used to communicate with an IC card installed in the dual-interface card sleeve through a second RF channel; the peripheral interface is used to communicate with peripheral equipment; and the main controller is used to control the peripheral interface, the first read module and the second read module.

13. The multi-frequency card reader according to claim 12, wherein:
the micro IC card includes:
a first communication interface for performing a contact communication;
a second communication interface for performing a contactless communication; and
a main module for processing data transceived by the first communication interface and the second interface, and controlling the first communication interface and the second communication interface;
the RF card sleeve includes:
a first card body;
a first holding chamber installed in the first card body for holding the micro IC card; and
a main interface, a main control module, and RF communication module installed in the first card body,
wherein:
the main interface is used to communicate with the micro IC card installed in the first holding chamber; the RF module is used to perform RF communication; and the main control module is used to perform transceiving and initial analysis of task commands, and to distribute the task commands based on the initial analysis results; and
the multi-frequency card reader includes:
a first read module for communicating with the micro IC card installed in the RF card sleeve through a first RF channel;
a second read module for communicating with the micro IC card installed in a dual-interface card sleeve through a second RF channel;
a peripheral interface for communicating with peripheral equipment; and
a main controller for controlling the peripheral interface, the first read module, and the second read module.

14. The multi-frequency card reader according to claim 12, wherein:
the first read module includes a low frequency transmitting coil, a drive circuit, a code circuit, a second control and interface circuit, a second RF transceiver circuit and a second RF antenna; and
the low frequency transmitting coil, the drive circuit, the code circuit, the second control/interface circuit, the second RF transceiver circuit and the second RF antenna are sequentially connected in serial.

15. The multi-frequency card reader according to claim 12, wherein:
- a working frequency of the first read module is 2.4 GHz; and
- a working frequency of the second read module is 13.56 MHz.

16. A communication system, comprising:
- a micro IC card;
- a radio frequency (RF) card sleeve; and
- a multi-frequency card reader,
wherein:
- the micro IC card is used to communicate with the RF card sleeve through a contact interface; and
- the multi-frequency card reader is used to perform RF communication with the RF card sleeve.

17. The communication system according to claim 16, wherein:
the micro IC card includes:
- a first communication interface for performing a contact communication;
- a second communication interface for performing a contactless communication; and
- a main module for processing data transceived by the first communication interface and the second interface, and controlling the first communication interface and the second communication interface;

the RF card sleeve includes:
- a first card body;
- a first holding chamber installed in the first card body for holding the micro IC card;
- a main interface, a main control module, and an RF communication module installed in the first card body,
    wherein:
    - the main interface, the main control module, and the RF communication module are sequentially connected; the main interface is used to communicate with the micro IC card installed in the first holding chamber; the RF module is used to perform an RF communication; and the main control module is used to perform transceiving and initial analysis of task commands, and to distribute the task commands based on the initial analysis results; and the multi-frequency card reader includes:
- a first read module for communicating with the micro IC card installed in the RF card sleeve through a first RF channel;
- a second read module for communicating with the micro IC card installed in a dual-interface card sleeve through a second RF channel;
- a peripheral interface for communicating with peripheral equipment; and
- a main controller for controlling the peripheral interface, the first read module, and the second read module.

18. The communication system according to claim 16, wherein further includes:
- a dual-interface sleeve used to cooperate with the micro IC card to perform a contactless communication.

19. The communication system according to claim 18, wherein:
- the dual-interface card sleeve includes a second card body;
- a second holding chamber is installed in the second card body for holding a micro IC card;
- an antenna is installed in or on the second card body; and
- the antenna is used to connect with the micro IC card installed the second holding chamber to cooperate with the micro IC card to perform a contactless communication.

20. A communication system, comprising:
- a micro IC card;
- a dual-interface card sleeve; and
- a multi-frequency card reader,
wherein:
- the dual-interface card sleeve is used to cooperate with the micro IC card to perform a contactless communication; and
- the multi-frequency card reader is used to perform an RF communication with the micro IC card installed in the double interface.

21. The communication system according to claim 20, wherein:
the micro IC card includes:
- a first communication interface for performing a contact communication;
- a second communication interface for performing a contactless communication; and
- a main module for processing data transceived by the first communication interface and the second interface, and controlling the first communication interface and the second communication interface;

the dual-interface card sleeve includes:
- a second card body;
- a second holding chamber installed in the he second card body for holding a micro IC card; and
- an antenna installed in or on the second card body used for connecting with the micro IC card installed the second holding chamber to cooperate with the micro IC card to perform a contactless communication; and the multi-frequency card reader includes:
- a first read module for communicating with the micro IC card installed in the RF card sleeve through a first RF channel;
- a second read module for communicating with the micro IC card installed in a dual-interface card sleeve through a second RF channel;
- a peripheral interface for communicating with peripheral equipment; and
- a main controller for controlling the peripheral interface, the first read module, and the second read module.

* * * * *